United States Patent
Box (10) Patent No.: US 6,748,542 B2
(45) Date of Patent: Jun. 8, 2004

(54) TIMED DISCONNECT SWITCH FOR DATA AND TELEPHONE CIRCUITS

(75) Inventor: Jeffrey L. Box, Dallas, TX (US)

(73) Assignee: Pathlock Corporation, Addison, TX (US)

( * ) Notice: Subject to any disclaimer, the term of this patent is extended or adjusted under 35 U.S.C. 154(b) by 279 days.

(21) Appl. No.: 09/803,399

(22) Filed: Mar. 12, 2001

(65) Prior Publication Data

US 2002/0129267 A1 Sep. 12, 2002

(51) Int. Cl.7 .......................... G06F 12/14; G06F 15/16
(52) U.S. Cl. .................... 713/201; 709/208; 379/406.03
(58) Field of Search ................................ 713/200, 201; 709/208; 379/410, 416, 406.03

(56) References Cited

U.S. PATENT DOCUMENTS

| | | | |
|---|---|---|---|
| 4,494,012 A | 1/1985 | Coker | 307/132 |
| 5,506,573 A | 4/1996 | Ewing | 340/644 |
| 5,715,214 A | 2/1998 | Svarnias | 368/10 |
| 5,859,908 A * | 1/1999 | Begeja et al. | 379/406.03 |
| 5,949,974 A | 9/1999 | Ewing | 395/200.32 |
| 6,003,132 A | 12/1999 | Mann | 713/188 |
| 6,081,894 A | 6/2000 | Mann | 713/200 |
| 6,119,236 A * | 9/2000 | Shipley | 713/201 |
| 6,121,889 A | 9/2000 | Janda | 340/815.47 |
| 6,145,083 A | 11/2000 | Shaffer | 713/201 |
| 6,366,951 B1 * | 4/2002 | Schmidt | 709/208 |

\* cited by examiner

Primary Examiner—Ly V. Hua
(74) Attorney, Agent, or Firm—Howison & Arnott, L.L.P.

(57) ABSTRACT

A timer operated hardware switching device to control the connection between a computer and telephone or data circuit. The device improves the security of the computer by limiting external access from the Internet or other networks. Security software programs such as fire walls are enhanced by the invention, which prevents electronic attacks during periods when the switching device is in the disconnected state. The device is simple to understand and can be easily verified in operation. Additionally, such a device can be used with conventional telephone applications to prevent calls from being made during specific time periods. The invention can be embodied as a standalone device, a device for use with a conventional power timer, and a device built into a computer or other computer accessory.

6 Claims, 8 Drawing Sheets

PC Power Controller with built in Timed Disconnect Switch

Typical Standard Power Timer Unit

Power Operated Timed Disconnect Switch Module

TIMED DISCONNECT SWITCH FOR DATA AND TELEPHONE CIRCUITS

CROSS REFERENCE TO RELATED APPLICATIONS

Not Applicable.

BACKGROUND

1. Field of Invention

This invention relates to using electronic and electromechanical timer technology to control the connections of information circuits such as telephone lines and data lines to computers. Said device increases the security by reducing the time available for external software attacks.

2. Discription of Prior Art

Many times, when a person goes on vacation, he connects a timed power switch device to operate lights in his residence while he is away. This gives the residence an occupied appearance to help ward off the criminal element.

Timers such as this use electromechanical or electronic technology to apply and remove electric power from a suitable power connector. One example of such a product is the TN-111 timer manufactured by Intermatic, Inc. of Spring Grove, Ill. Timers such as these are widely available in hardware stores to control electric power.

Timers are available for other power control applications as well. One example is a water sprinkler timer, which applies electric power to electrically operated water valves for the purpose of controlling water delivery to a lawn or other vegetation. Another example is a timer for operating a swimming pool filter pump.

But, once again, these timers are designed only to operate by turning electric power on and off to an external device.

In a different part of the marketplace is the personal computer, which is now present in millions of residences. A large number of these computers are connected to the Internet using a variety of methods such as Local Area Networks (LANs), telephone modems, ADSL modems, ISDN and cable TV modems.

Many of these data connections have what is commonly known as an "always on" nature where data may flow between the Internet and the computer at any time of the day or night. Additionally, many of the users of such computers prefer to leave them powered and operating at all times.

These "always on" computers are subject to electronic information attack from any other computer connected to the Internet anywhere in the world.

The users attempt to protect computers such attacks using security software packages commonly referred to as "fire walls". In addition, the computer operating systems and related Internet communication software incorporate features designed to reduce the chances of a successful electronic attack.

However, field experience has shown that most software, including security software, contains defects. A group of computer criminals, commonly referred to as "crackers", spends enormous efforts to identify and exploit weakness in software. Such weaknesses may allow the theft of sensitive information, such as credit card numbers, or other criminal activities.

From a security standpoint, such software products are simply not satisfactory. They contain many unknown defects and their performance simply can not be properly inspected by the average user. In addition, new defects are routinely discovered and published.

Thus, there is a need for a device that goes beyond software to disconnect the computer from the Internet at times when it is not appropriate for such a connection to exist. For the reasons listed above, such a device should have no software or as little software as possible. It should be predominantly hardware designed so that its operation can be inspected and easily understood.

Such a device could be used to enhance the performance of security software by greatly reducing the number of hours that the computer is connected and subject to attack.

An example application might be a computer user who only uses his computer for a few hours during the day. If the invention would disconnect his computer from the Internet the rest of the time, it greatly reduces the chance that an external Internet attack will be successful. Simply stated, the computer can not be attacked from the Internet when it is not connected to the Internet. Like a steering wheel lock for a car, the invention greatly frustrates the attack and makes the attacker more likely to simply move on to another target.

Thus, the invention consists of a timer unit that operates circuitry to disconnect the computer from telephone and/or data connections. Beyond the security application, there are additional applications for such a device.

It may be used with telephones to prevent calls during meal times or other times when a telephone call is unwelcome.

It may be used to limit the duration of children' access to the Internet, telephone, or other data services.

SUMMARY

In accordance with the present invention, an electric or electronic timer connected to a circuit that can disconnect various types of telephone and data transmission circuits. This is referred to as a "Timed Disconnect Switch". Such a product family might have individual units designed for specific circuit types such as telephone lines, cable modems, LAN's, and others.

The invention may be implemented as a stand alone device which plugs into a power source and has connectors and internal switching suitable for the various media supported. Or, the invention may be added as a feature to another computer or computer accessory device such as a power controller, modem, or other device. Or the invention may be built into the a computer itself.

Since there are many timed power switches available on the market, it is also possible to build the invention into a module that is intended to plug into a commercially available timed power switch. In that case, the invention provides a power operated switch or relay that controls the data or telephone connection.

OBJECTS AND ADVANTAGES

The object of this invention is to enhance the security of computers connected to networks and the Internet by using timer technology to disconnect the computer from the external networks during such time when there is no productive reason to maintain said connection.

Thus, for a typical computer, the timer should be set so that the computer is disconnected from the telephone and/or data circuits during periods when the user is away from it.

From the perspective of someone trying to gain illicit access to the computer, the timer causes long periods when traditional software attacks will not operate. Thus, an object of the invention is to frustrate the attacker and cause him to move on to other targets.

An additional object of this invention is to compliment the operation of software products such as fire walls. While these products are also intended to prevent a software attack, they are routinely found to have software defects that may allow illicite access. This invention will greatly reduce the opportunities to exploit such weaknesses by reducing the time that the computer is connected to the external networks.

An additional object of the invention is the ability to disconnect telephone line access for periods to prevent calls from being received. One example is to use the device to disconnect telephones from lines during periods such as dinner.

LIST OF REFERENCE NUMERALS IN DRAWINGS

1. Data or telephone connection.
2. Computer or telephone device.
3. Timed Disconnect Switch device.
4. User controls for timer.
5. Electronic or electromechanical timer mechanism.
6. Switch or relay operated by timer mechanism.
7. Connector for data or telephone connection.
8. Connector for computer or telephone device.
9. Power plug for power operated disconnect switch.
10. Power receptacle on standard power timer unit.
11. Industry standard power timer.
12. Power operated Timed Disconnect Switch designed as a module that plugs into standard power timer.
13. Activity detector for connection type supported.

DESCRIPTION—PREFERRED EMBODIMENT

Figure 1:
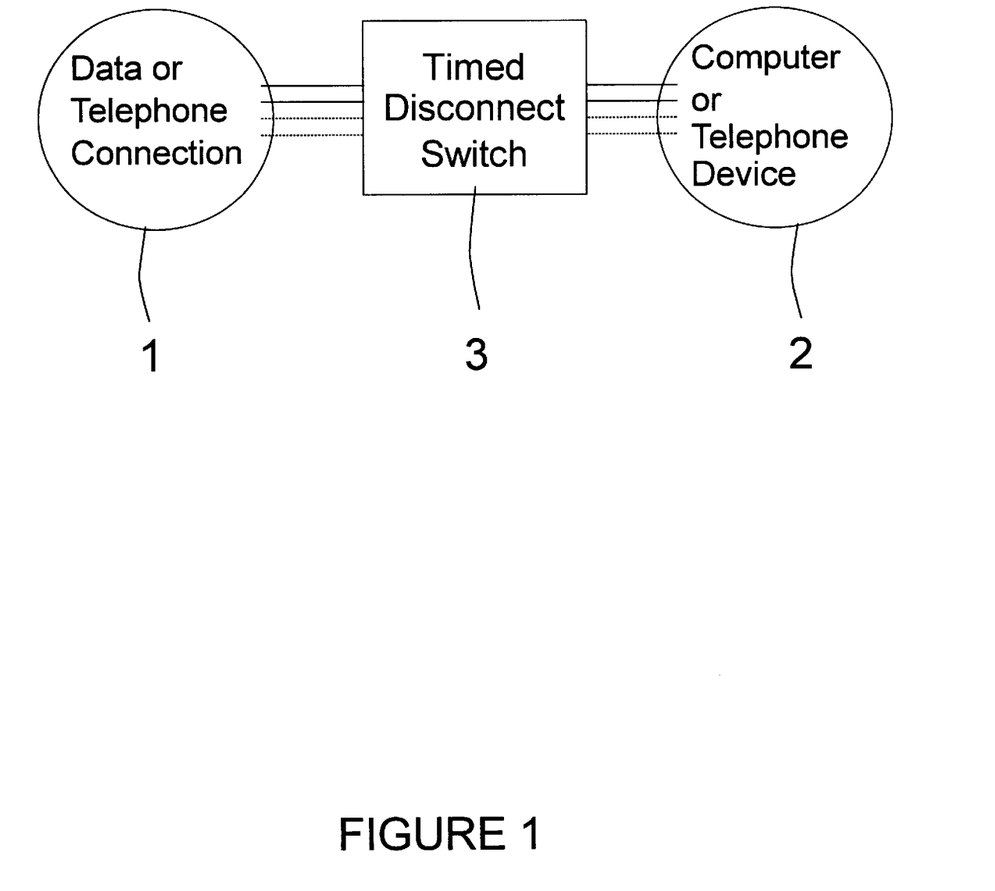
FIG. 1 is a block diagram showing how the Timed Disconnect Switch invention may be connected between a computer and a network or telephone connection.

The preferred embodiment of the invention is as a small stand alone device 3 that is inserted between a computer or telephone device 2 and a data or telephone connection 1 as shown in FIG. 1. Timed Disconnect Switch device 3 is inserted in the cable connection that normally exists between computer or telephone 1 and data or telephone connection 2.

Figure 2:
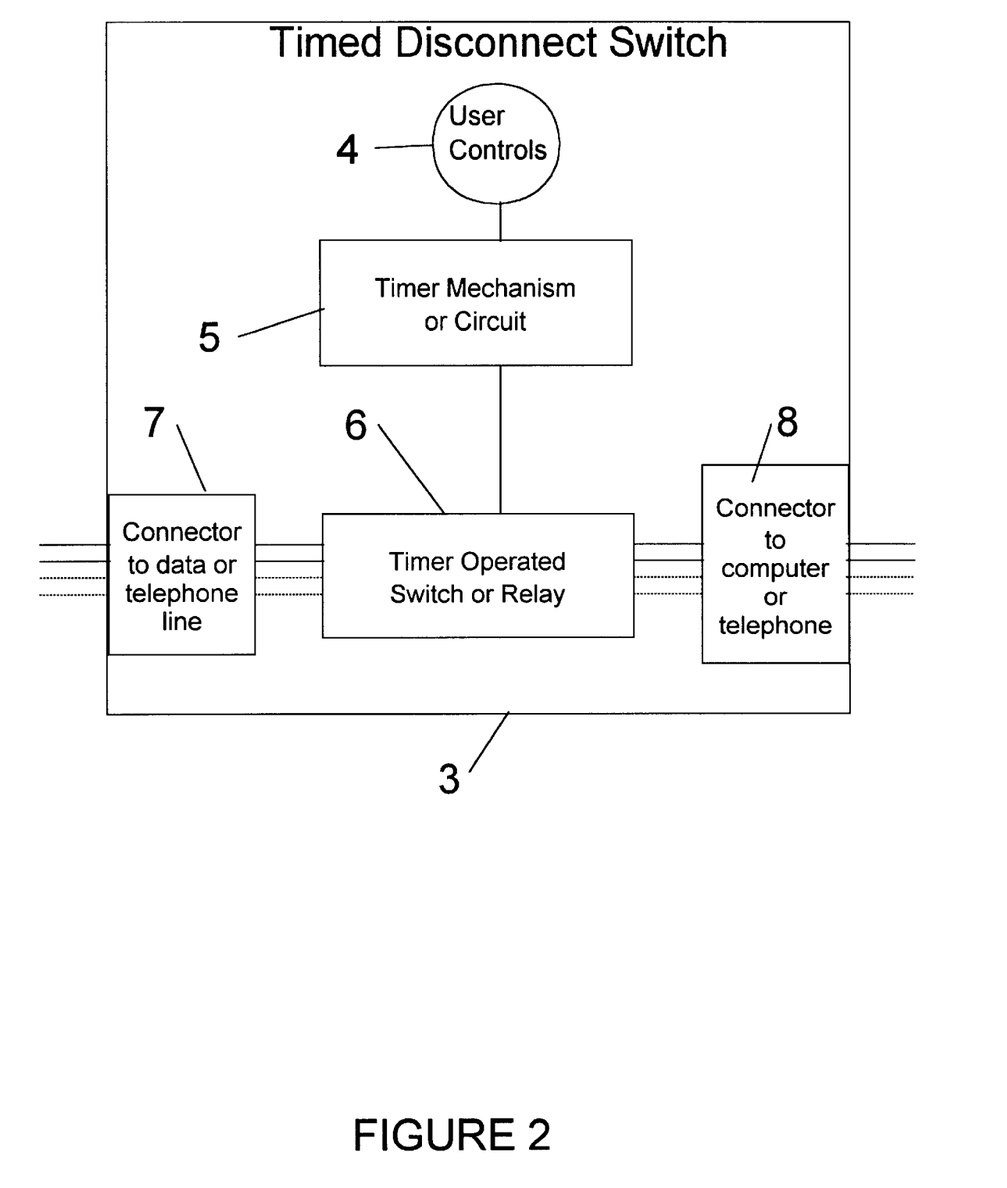
FIG. 2 is a block diagram of the invention showing the elements it is composed of when supplied as a stand alone device.
Figure 3:
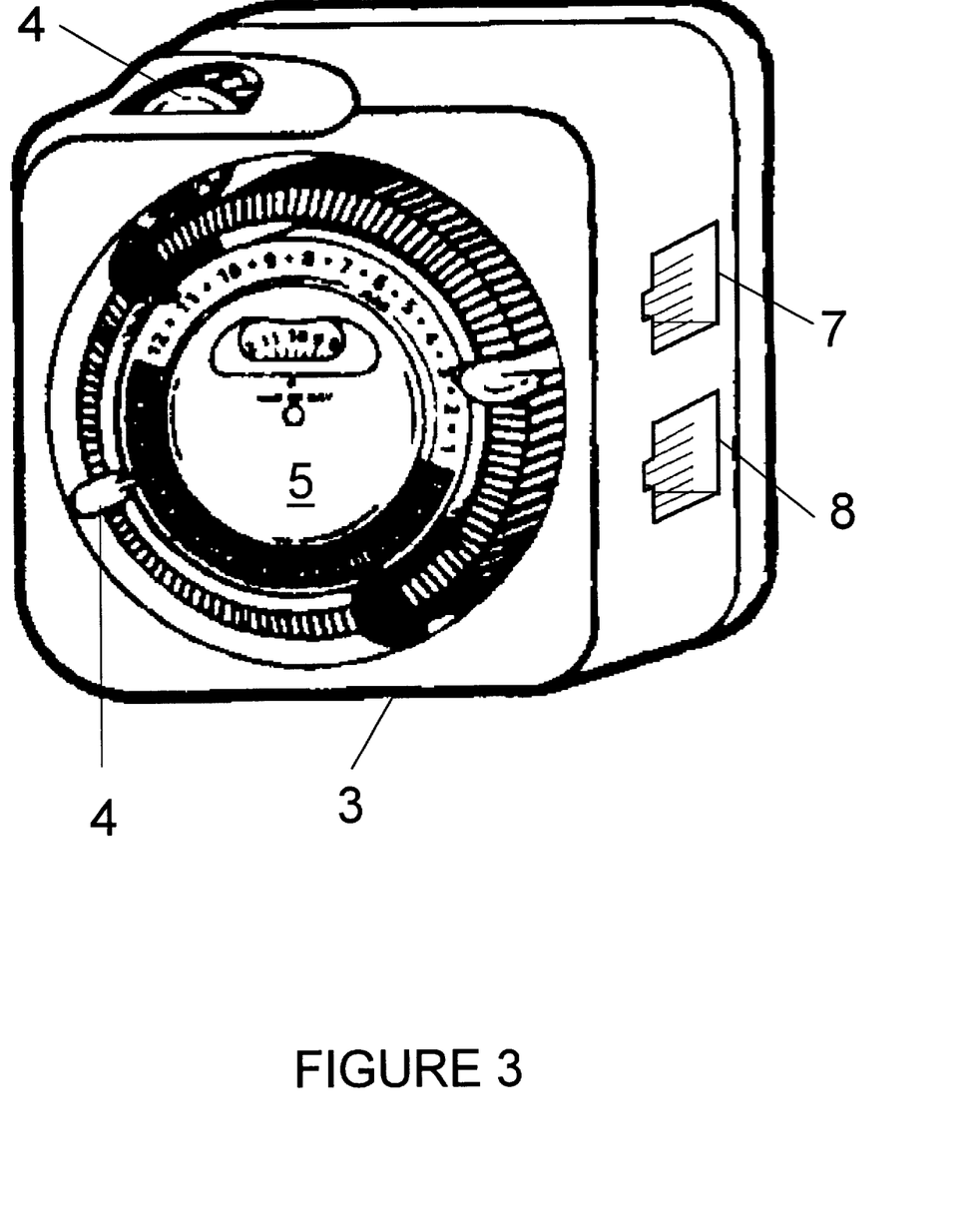
FIG. 3 is an illustration of a electromechanical timer that has typical telephone/data modular connectors instead of the traditional power receptacle.
Figure 4:
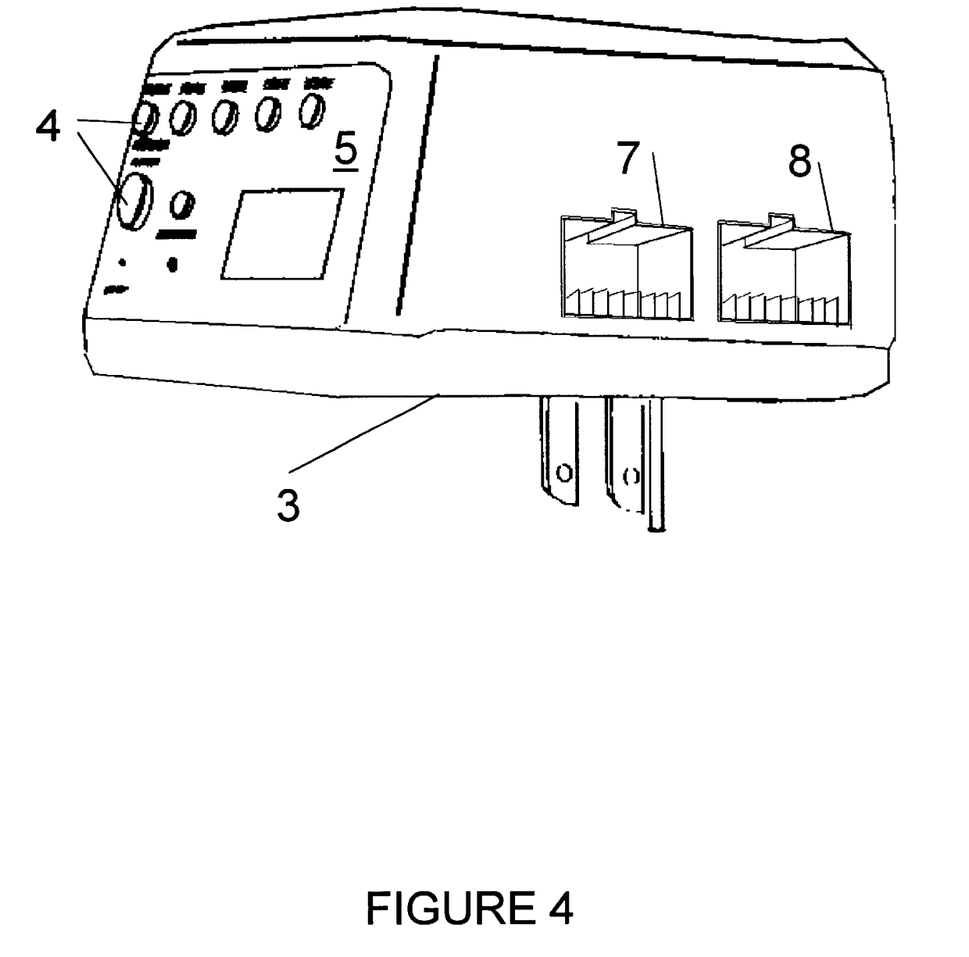
FIG. 4 is an illustration of a electronic timer that has typical telephone/data modular connectors instead of the traditional power receptacle.

FIG. 2 illustrates the internal elements of device 3. A timer 5 is controlled by a set of user controls 4. If timer 5 is electromechanical, user controls 4 are typically mechanical timer dial settings and peg setting devices as illustrated in FIG. 3. If timer 5 is electronic, user controls 4 typically consist of a small digital display and a set of push buttons to set timer 5 values as illustrated in FIG. 4.

In both cases, timer 5 operates a switch or relay 6. This can be implemented with mechanically operated metallic contacts, an electric relay, or an electronic switching circuit as needed by the connection type supported.

Switch or relay 6 is connected between a connector 7 and a connector 8. Connectors 7,8 are selected to support the type of media being controlled. Typical media are wire telephone connections, Ethernet, coaxial cable, Universal Serial Bus, and others that may come into use as the technology evolves.

Under control of timer 5, switch or relay 6 takes on either of two possible states designated as "connected" and "disconnected". When in the "disconnected" state, computer or telephone 2 is electrically isolated from data or telephone connection 1, preventing any possible information transmission.

In the "disconnected" state, any attempts to access computer or telephone 2 from telephone or data connection 1 will be completely prevented. Ideally, timer 5 is set to keep switch or relay 6 in the "disconnected" state in as much of the time as practical.

Timer 5 can use a variety of strategies for operation. It may be set to simply disconnect computer or telephone 2 for scheduled periods. In another mode, it could be designed to connect computer or telephone 2 for a period of time when a manual control is activated. Thus, a user might push a button to set timer 5 for a period of time in the "connected" state. At the end of that time, the user pushes the button again to continue or timer 5 expires and switch or relay 6 automatically returns to the "disconnected" state.

Figure 8:
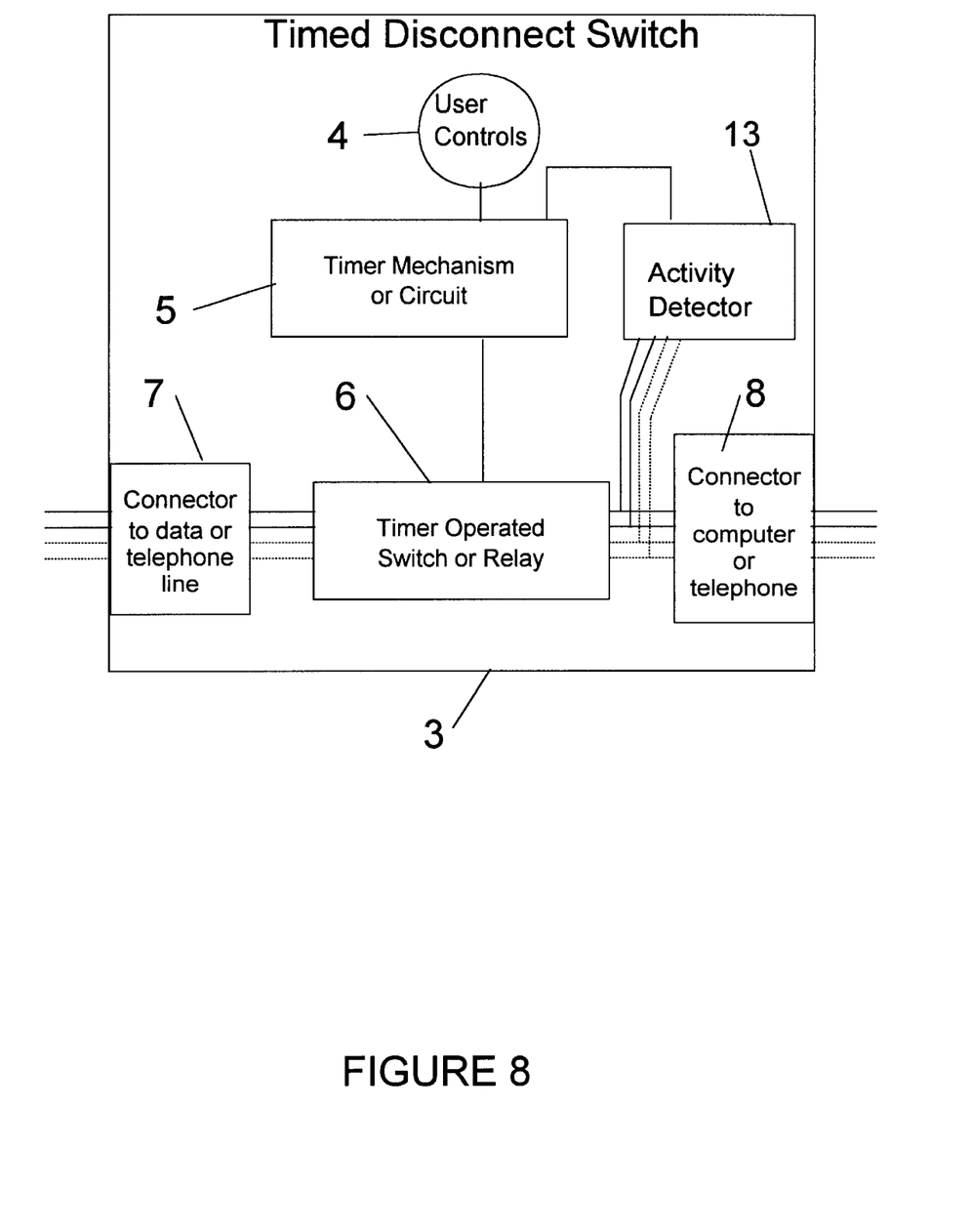
FIG. 8 is a block diagram of the Timed Disconnect Switch device showing the elements of it when supplied as a stand alone device and uses an activity detector to trigger the timer mechanism.

An additional way to control timer 5 is to provide an activity detector 13 that detects activity from computer or telephone 2 trying to access telephone or data line 1 and then triggers timer 5 to close switch or relay 6 for a timed period. When switch or relay 6 is in the "disconnected" state, activity from connector 7 will not trigger timer 5. This is illustrated in FIG. 8.

Activity detector 13 is designed to support the type of information carried through device 3 connection. For a standard telephone connection, activity detector 13 would be a loop current detector with voltage source. For various other data types, it would be a data detector suitable for the media involved.

In all cases, when switch or relay 6 is in the "connected" state, computer or telephone 2 operates as normally connected to data or telephone circuit 1. When used with computers 2, Timed Disconnect Switch device 3 is intended to be used with existing software security products and enhance their effectiveness by reducing the time periods when computer 2 might be vulnerable to external information attack.

FIG. 3 shows how device 3 may be designed with electromechanical timer 5. The product may have a similar form to existing power timers available with the exception that connectors 7,8 are provided instead of a power receptacle. Internal to the unit, switch or relay 6 would be operated by timer 5.

Figure 7:
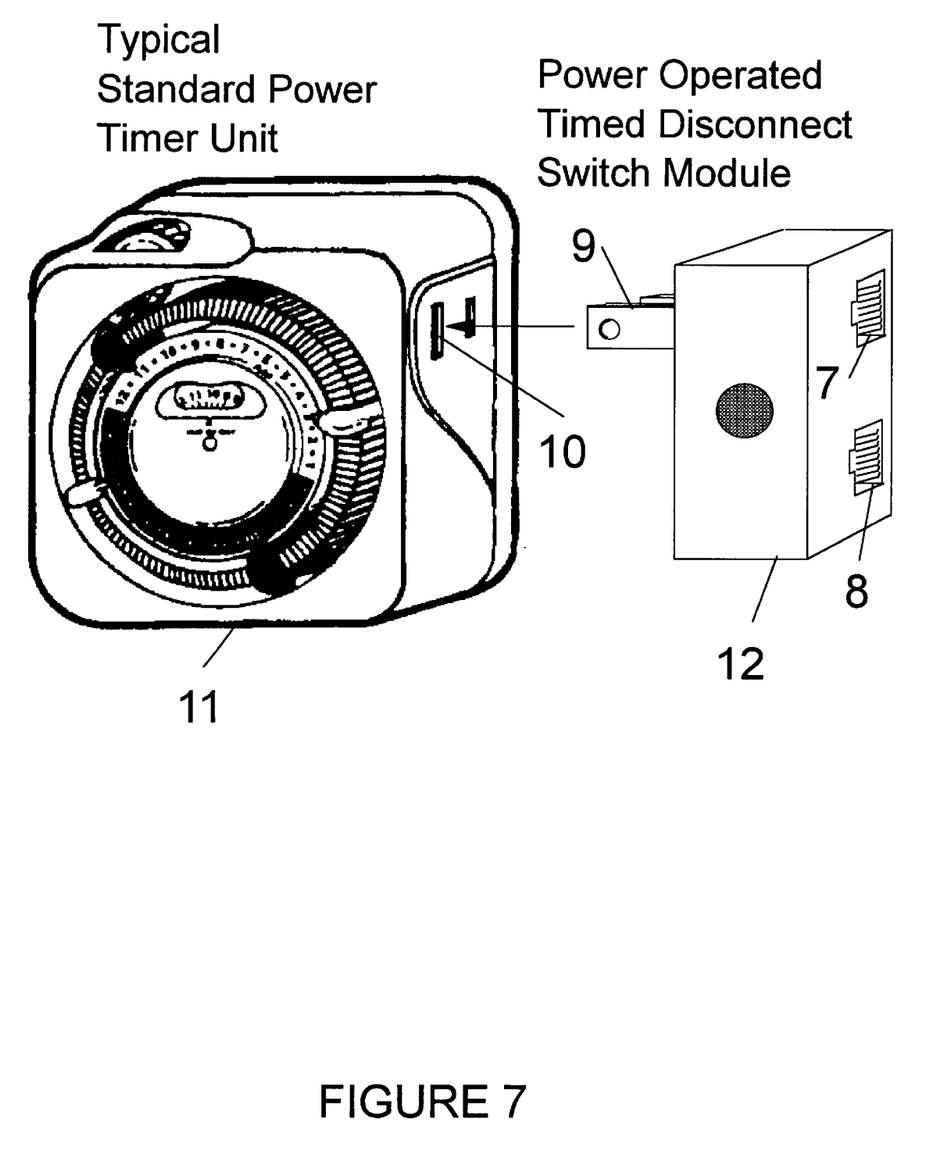
FIG. 7 is an illustration of how the invention may be constructed as a module that plugs into a commercially available power timer unit

FIG. 4 shows how device 3 may be designed with electronic timer 5, Once again, the addition of connectors 7,8 and internal switch or relay 6 differentiate the invention from commercially available power timers such as shown in FIG. 7.

Additional Embodiments

Figure 5:
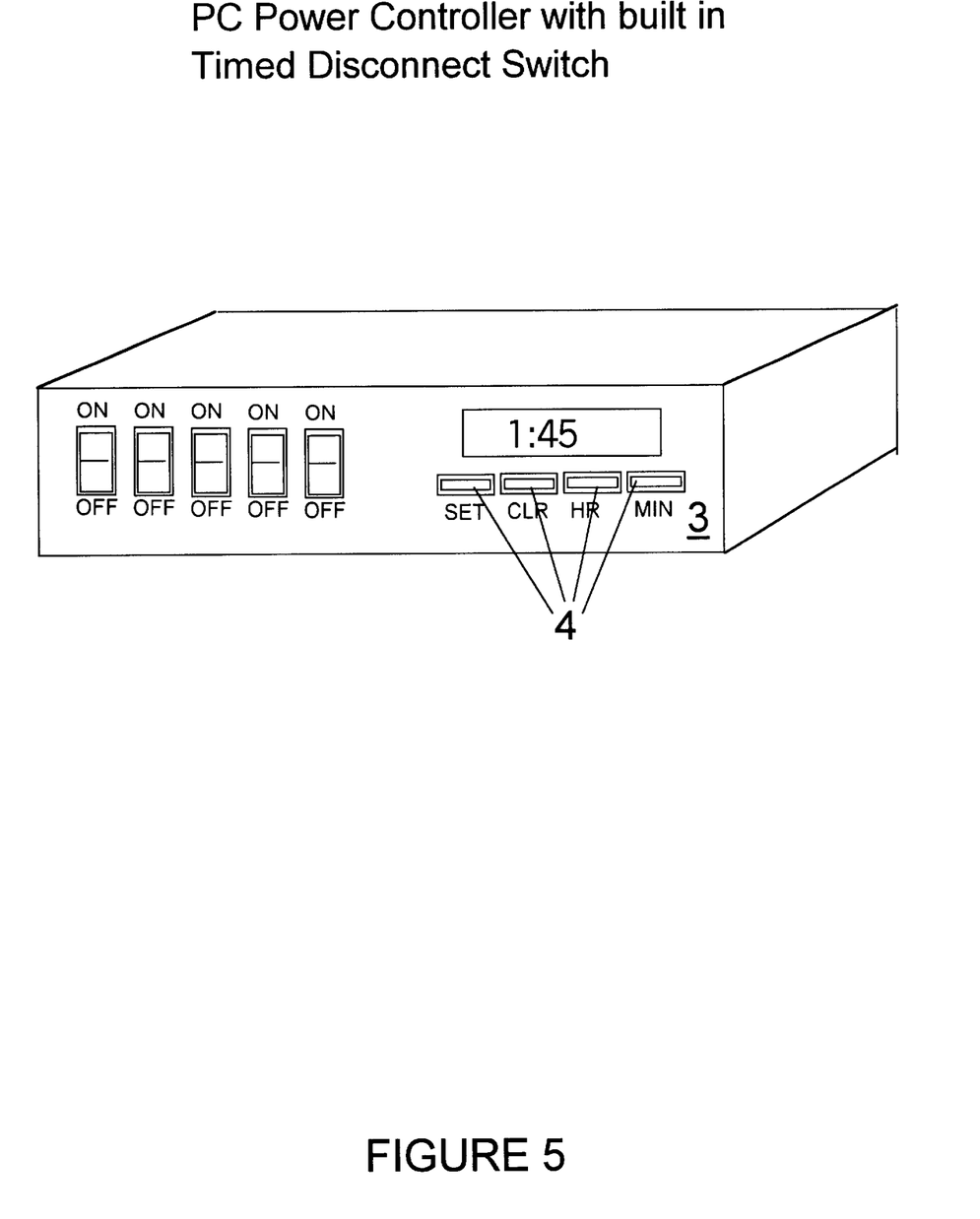
FIG. 5 is an illustration of a typical computer power controller unit that has the invention integrated to it.

An additional embodiment of this invention is to build it as a feature into other computer products. FIG. 5 illustrates the concept of Timed Disconnect Switch device 3 built into a PC power controller. Since such power controllers are widely used and adding device 3 to differentiate them in the marketplace should allow the seller to achieve a higher sales price.

Almost any computer accessory may be used to house device 3. Additional opportunities to incorporate device 3 include modems, computer desks, uninterruptible power supplies, monitors, and LAN interface devices. Additionally, device 3 could be built into computer or telephone 2 itself.

Figure 6:
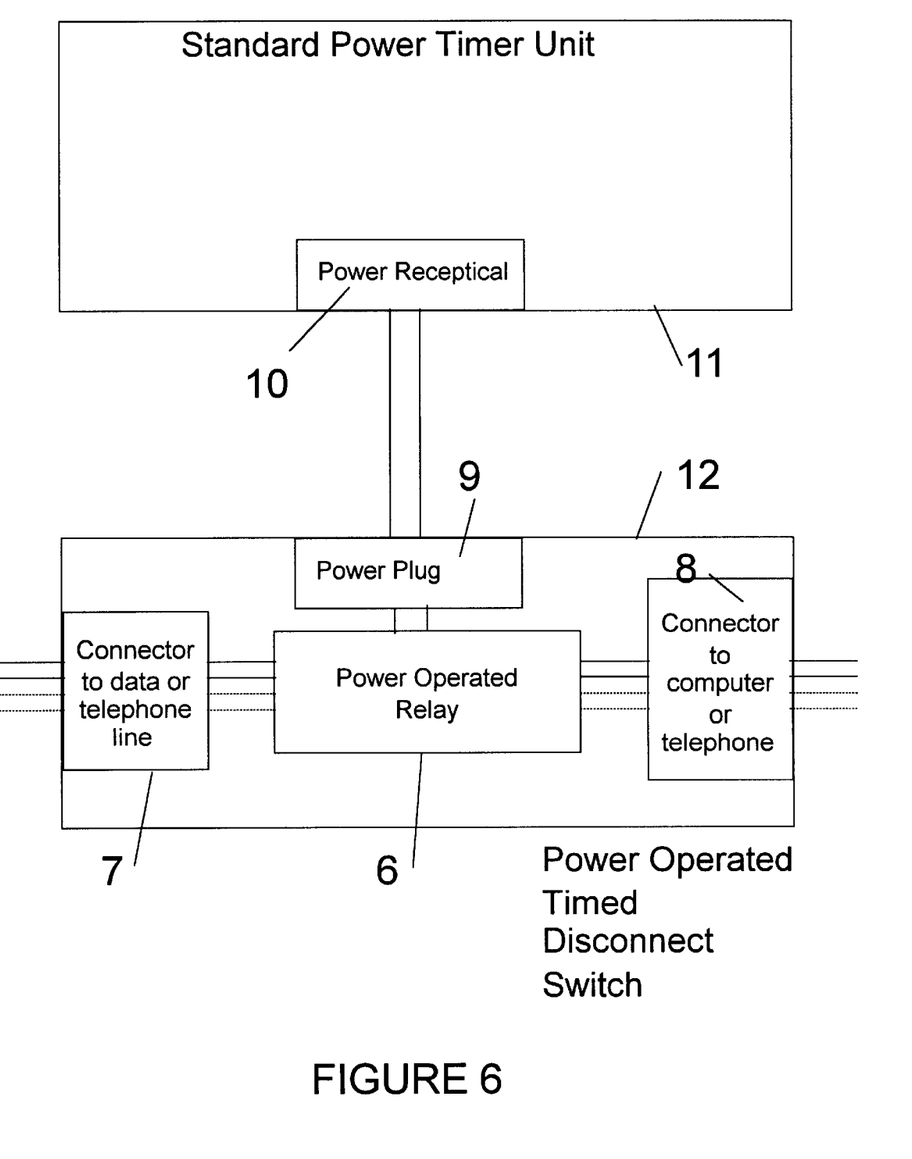
FIG. 6 is a block diagram of the invention in the form of a module that is intended to plug into a commercially available power timer unit.

FIG. 6 shows an additional embodiment of the invention that is designed as a module 12 to work with an industry standard power timer 11. In the example, industry standard power timer 11 provides timed power to a receptacle 10. Module 12 consists of a power plug 9 that plugs into receptacle 10. Power operated switch or relay 6 is connected between the connectors 7,8 to operate as previously described with "connected" and "disconnected" states. FIG. 7 illustrates how this might physically appear.

Timed Disconnect Switch device 3 may also be used in cases where a telephone 2 is controlled. This can be useful in preventing the receipt of telephone calls during meal times and other times when it is desirable to have the phones not ring. When applied with central office voice mail or an answering machine (not connected through the device), It can provide periods of peace in the home while messages are collected.

It is assumed that the final design of Timed Disconnect Switch device 3 and module 12 may include indicator lamps or other visual means to allow the user to readily determine if the unit is in the connected or disconnected state.

Ramifications and Scope

This device is intended to bring a level of simplicity to the complex world of computer security. By using timers that operate independently of the computer and the computer' software, these devices are not susceptible to the various forms of information and computer virus attack that frequently make headline news.

In the case of application to phones and telephone lines, the devices can be used to generate periods of tranquillity at home by preventing phones from ringing during scheduled periods.

It is intended that the foregoing detailed description be regarded as illustrative rather than limiting and that it is understood that the following claims including all equivalents are intended to define the scope of the invention.

What is claimed is:

1. A timed disconnect switch device, comprising:

an electronic or electromechanical timer, an electrical switch or relay operated by the timer, and a pair of connectors, said switch or relay disposed between said connectors with a telephone or data connection connected to one of said connectors and a service connected to the other of said connectors, to allow a telephone or data connection to be routed through said electrical switch or relay to allow said telephone or data connection to be connected to the service for communication therewith;

said timer operable to connect said pair of connectors together at a first time and to automatically disconnect the connection between said pair of connectors at a second time delayed from said first time by a predetermined and defined delay, such that any connection of the telephone or data connection to the service is completely prohibited after said second time.

2. The device of claim 1 wherein said connectors comprise RJ-11 style telephone circuit connectors intended for use with a conventional analog telephone line connection.

3. The device of claim 1 wherein said connectors comprise coaxial cable connectors intended to be used with cable modem technology.

4. The device of claim 1 wherein said connectors comprise coaxial cable connectors intended to be used with cable modem technology.

5. The device of claim 1 wherein said connectors comprise modular connectors intended for use with Universal Serial Bus interface technology.

6. The device of claim 1 further installed as part of a computer or as part of a computer accessory device from the group of a power control unit, an uninterruptable power unit, a modem, or a monitor, that adds the timed disconnect switch functionality to that computer or computer accessory.

* * * * *